(12) United States Patent
Day (10) Patent No.: US 8,307,373 B2
(45) Date of Patent: Nov. 6, 2012

(54) INTEGRATING ENTERPRISE REPOSITORY EVENTS INTO BUSINESS PROCESS MODEL AND NOTATION PROCESSES

(75) Inventor: Rouven Day, Waghäusel (DE)

(73) Assignee: SAP AG, Walldorf (DE)

( * ) Notice: Subject to any disclaimer, the term of this patent is extended or adjusted under 35 U.S.C. 154(b) by 564 days.

(21) Appl. No.: 12/556,533

(22) Filed: Sep. 9, 2009

(65) Prior Publication Data

US 2011/0061064 A1 Mar. 10, 2011

(51) Int. Cl.
*G06F 3/00* (2006.01)
(52) U.S. Cl. ...................................... 719/318
(58) Field of Classification Search .................. None
See application file for complete search history.

(56) References Cited

U.S. PATENT DOCUMENTS

2005/0251501 A1* 11/2005 Phillips et al. ............... 707/2
2008/0163166 A1* 7/2008 Raman ........................ 717/107
2009/0083297 A1* 3/2009 Pohl et al. .................... 707/101

OTHER PUBLICATIONS

Michael Havey "Essential Business Process Modeling", 2005, O'Reilly Media, 352 pages.*
Snabe et al. "Business Management the SAP Roadmap", Oct. 12, 2008, 62 pages.*
"Enterprise SOA with SAP NetWeaver", May 28, 2008, 22 pages.*

* cited by examiner

*Primary Examiner* — H. S. Sough
*Assistant Examiner* — Carina Yun
(74) *Attorney, Agent, or Firm* — Boris A. Matvenko, Esq.

(57) ABSTRACT

A system and method for integrating enterprise services repository (ESR) events into business process model and notation (BPMN) processes are disclosed. An instance of a message event definition is created based on an ESR event imported into a modeling infrastructure and which can be used as an event of a BPMN process modeled using the modeling infrastructure. The instance of the message event definition is provided as a trigger of the event of the BPMN process for a business process application. The instance of the message event definition is associated with an instance of the event of the BPMN process to link the enterprise service repository event to the BPMN process.

19 Claims, 5 Drawing Sheets

INTEGRATING ENTERPRISE REPOSITORY EVENTS INTO BUSINESS PROCESS MODEL AND NOTATION PROCESSES

BACKGROUND

This disclosure relates generally to business process modeling systems, and more particularly to a system and method for integrating Enterprise Service Repository (ESR) events into business process model and notation (BPMN) processes.

An enterprise service is a callable entity that provides business functionality, and which is structured according to a harmonized enterprise model based on global data types (GDTs), process components, and business objects. Enterprise services are typically stored in an enterprise services repository (ESR), such as SAP's Enterprise Services Repository of its Netweaver Business Process Management (BPM) suite. An ESR stores the definitions and metadata of enterprise services, and provides an integrated modeling environment for defining enterprise services, data types, and other design objects for SOA-based business processes in a standards-compliant manner. Further, an ESR such as SAP's Enterprise Services Repository can be consumed by BPMN processes, and further can expose event definitions that describe events that can occur in other systems, such as the SAP Business Suite.

As a BPMN tool, it would be advantageous for a business process modeling system to be able to consume ESR events easily. Therefore a mechanism is needed that enables the use of ESR Events inside BPMN processes.

SUMMARY

In general, this document discloses a system and method for integrating Enterprise Service Repository (ESR) events into business process modeling notation (BPMN) processes.

In accordance with one aspect, a computer-implemented method for integrating enterprise services repository (ESR) events into business process model and notation (BPMN) processes is presented. The method is preferably performed by execution of computer readable program code by at least one processor of at least one computer system. The method includes creating, using at least one of the processors, an instance of a message event definition based on an ESR event imported into a modeling infrastructure and which can be used as a event of a BPMN process modeled using the modeling infrastructure. The method further includes providing, using at least one of the processors, the instance of the message event definition as a trigger of the event of the BPMN process for a business process application, and associating, using at least one of the processors, the instance of the message event definition with an instance of the event of the BPMN process to link the enterprise service repository event to the BPMN process.

In accordance with another aspect, a system for integrating enterprise services repository (ESR) events into business process model and notation (BPMN) processes is presented. The system includes a storage device including an enterprise services repository, and a process composer computer including a BPMN tool in communication with the storage device. The process composer includes software to implement a method including creating an instance of a message event definition based on an ESR event imported into a modeling infrastructure and which can be used as an event trigger of a BPMN process modeled using the modeling infrastructure, providing the instance of the message event definition as a trigger of the event of the BPMN process for a business process application, and associating the instance of the message event definition with an instance of the event of the BPMN process to link the enterprise repository event to the BPMN process.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for integrating ESR events into BPMN processes. In some implementations, the ESR events are integrated into BPMN processes using an object-oriented programming language such as JAVA. In a specific implementation, JAVA code runs inside a plug-in-oriented, process development environment such as the ECLIPSE platform, also referred to as a process composer. The ECLIPSE platform provides extension mechanisms via plug-ins. The corresponding plug-ins are loaded by the Eclipse framework whenever the functionality of a plug-in is needed.

The code for integrating ESR Events into a BPMN tool, such as SAP's Galaxy BPMN modeling tool, which is part of a process composer module of a business process modeling application, can be—amongst other functionality—stored in the BPMN tool plug-in. This code interacts with a modeling infrastructure (MOIN), such as the modeling infrastructure of SAP for Eclipse-based tools. The MOIN enables model-driven development, meaning that things, such as, for example, BPMN artifacts, that are modeled by a user are stored in the form of models inside the MOIN based on given metamodels.

In a specific exemplary implementation, a system and method for integrating ESR events into BPMN processes works as follows: Once the user selects an event definition from the ESR system, a corresponding WSDL document is imported by a WSDL importer. The WSDL importer creates the corresponding model instances (service interface, operations(s), message(s), and data type(s)) for the WSDL document inside the MOIN.

Once the WSDL importer detects that the imported WSDL document is tagged as an event, it calls a mechanism to create an instance of a Message Event Definition inside the MOIN, in addition to every operation described in the WSDL document, and displays it as a message trigger in a project tree of the process development environment user interface. These message triggers are instances of Message Event Definitions that can be used as triggers for BPMN events.

Once an ESR Event is selected as the trigger of an event of a process, the Event instance is association with the Message Event Definition instance in the model. By the Message Event Definition instance, the process server knows that once the ESR Event has been fired, the process associated with this Message Event Definition instance is started. Events in the ESR are described in Web Services Definition Language (WSDL) and marked as events via a special tag inside the WSDL document, as follows:

```
<ifw:properties>
    <ifw:additionalAttributes>
        <ifw:attribute name="isEvent">true</ifw:attribute>
    </ifw:additionalAttributes>
</ifw:properties>
```

Figures 1, 1B:
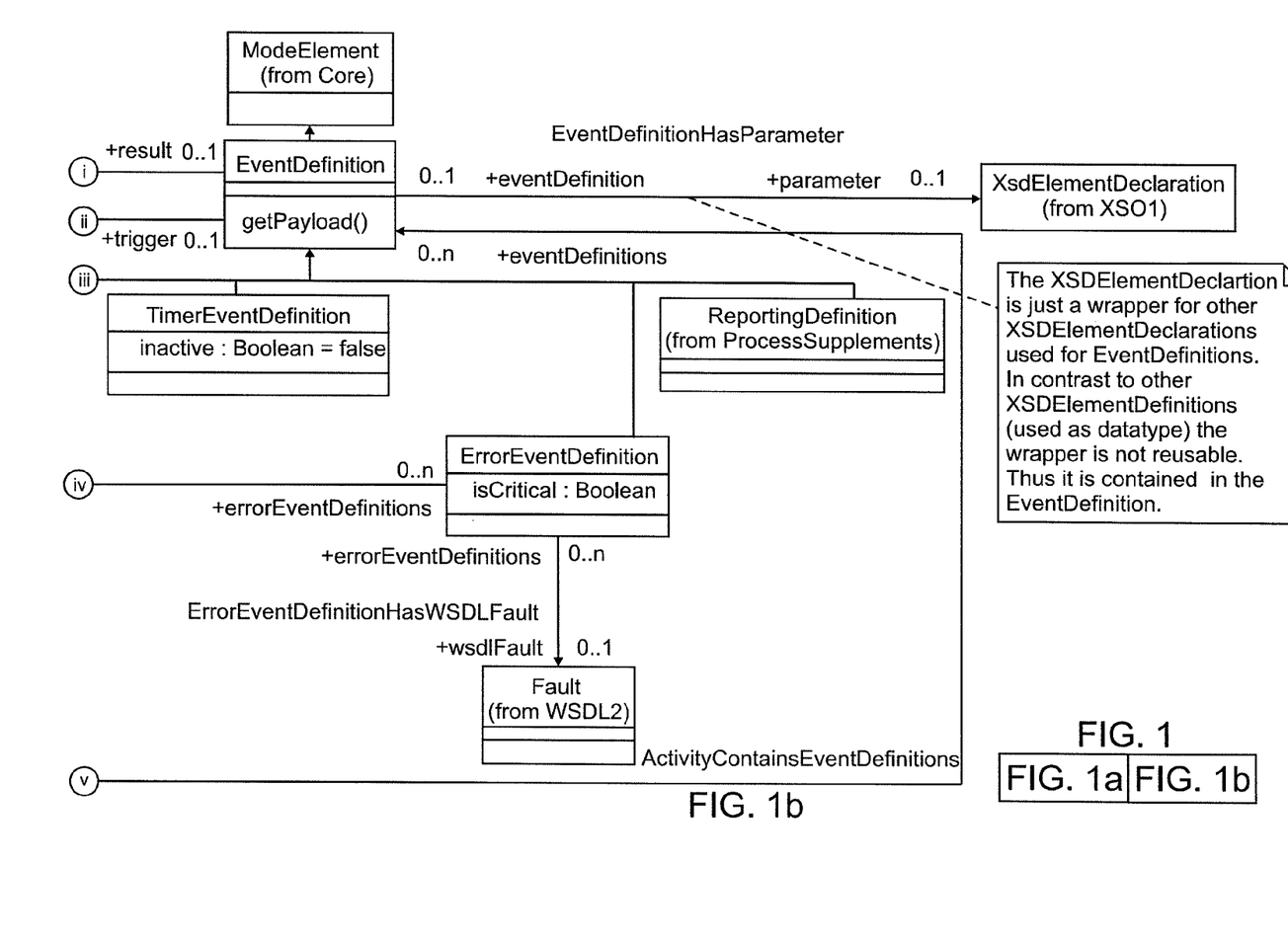
FIG. 1 illustrates a metamodel of message event definitions used as triggers of events of a BPMN process.
Figure 1A:
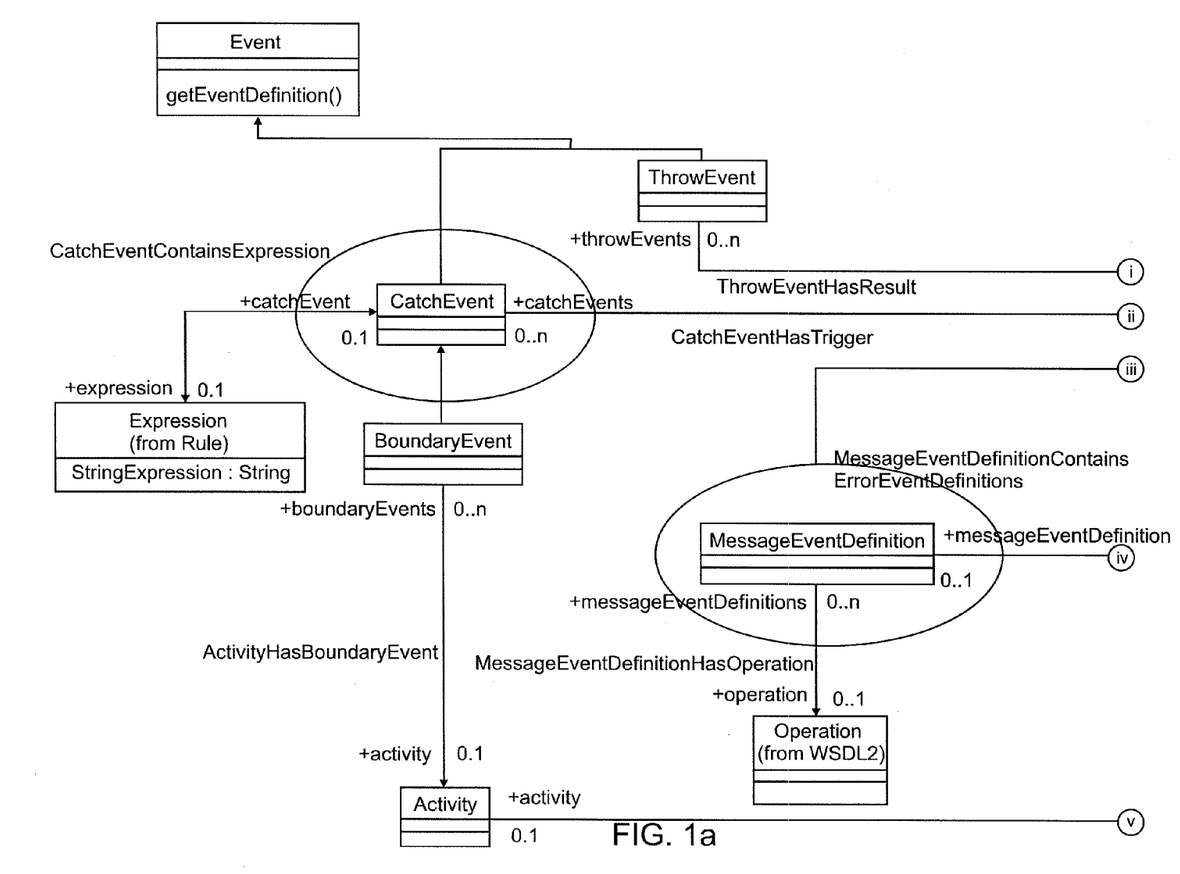

Once a service interface with marked operation is imported into the BPMN tool of NW BPM, besides the regular service interface a message trigger is created in addition that represents the ESR event as a BPMN construct and which can be used as trigger of BPMN events, as illustrated in FIG. 1.

Figure 2:
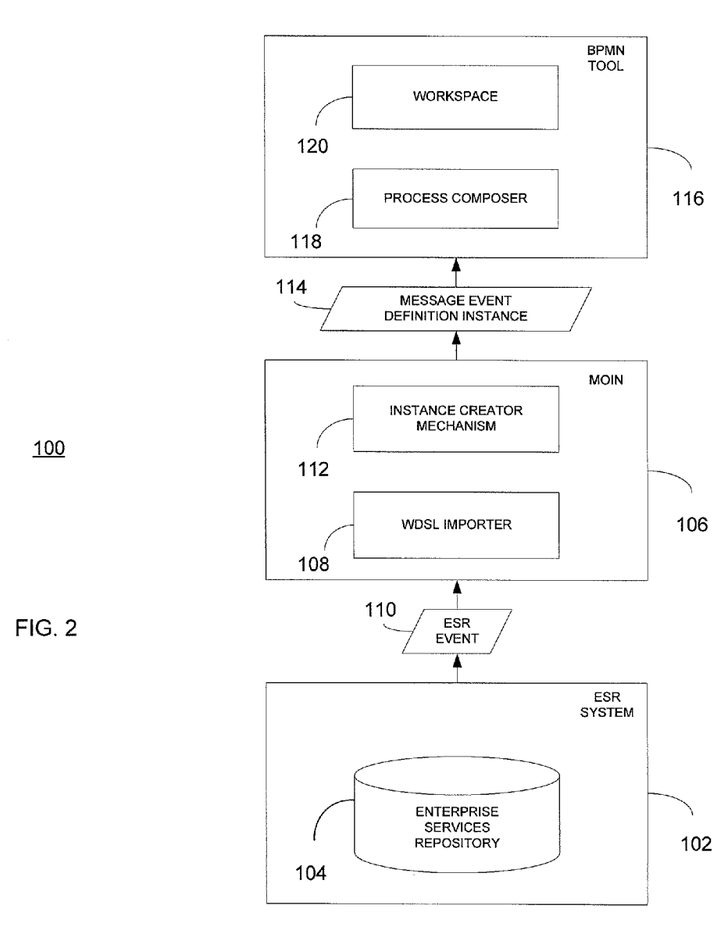
FIG. 2 is a block diagram of a system for integrating ESR events into BPMN processes.

FIG. 2 is a block diagram of a system 100 that a method for integrating ESR events into BPMN processes. The system 100 includes an ESR system 102 that includes an enterprise services repository (ESR) 104, which is preferably implemented as a data repository within a storage device including machine-readable media. The ESR 104 stores ESR events, stored as WSDL documents, and which include one or more operations or services to be performed by a business process that uses the ESR event.

The system 100 further includes a modeling infrastructure (MOIN) 106 that enables model-driven development of BPMN processes based on a BPMN metamodel. The MOIN 106 includes a WSDL importer 108 that imports user-selected ESR events, as WSDL documents, into the MOIN 106 for being tagged as an event of a BPMN process and configured as a Message Event Definition instance by an instance creator mechanism 112. The WSDL importer 108 creates corresponding model instances of a Message Event Definition inside the MOIN 106 for every operation described in the WSDL document, and upon detection of an imported WSDL document as tagged as an event, i.e. based on the code described above, for example, calls the instance creator mechanism 112 to create the instance of the Message Event Definition 114 that allows it to be represented and described as a message trigger in a project tree of a BPMN tool 116.

Figure 4:
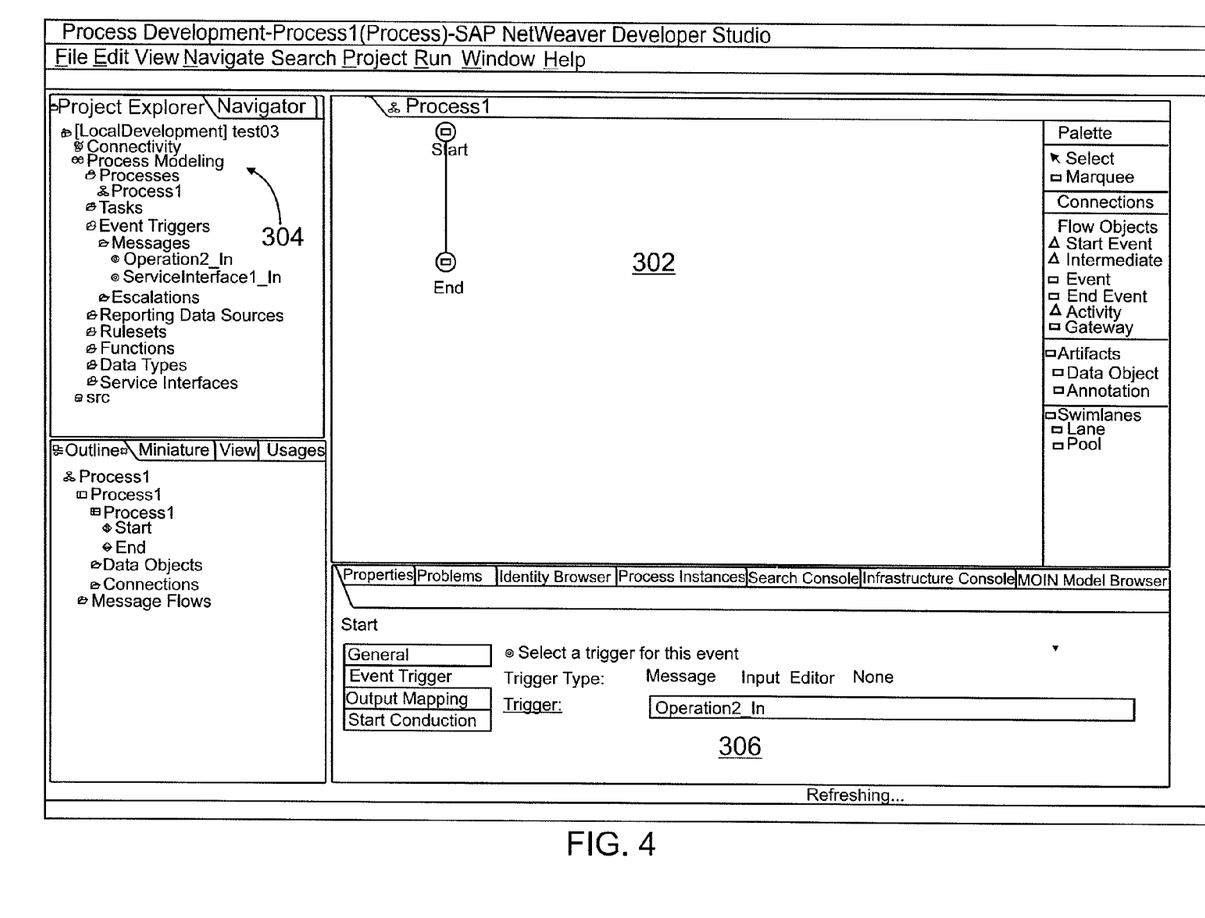
FIG. 4 shows an exemplary user interface of BPMN tool in which ESR events can be integrated into BPMN processes.

The BPMN tool 116 includes a process composer 118 that generates a workspace 120 for a user. The process composer 118 includes a user interface 300, such as shown in FIG. 4, that includes a graphical area 302 for depicting a graphical notation of BPMN processes, a project tree 304 that shows a tree-based representation of processes and the event triggers, among other information. The user interface also includes a properties area 306 in which properties and attributes of processes and/or event triggers can be configured by a user interacting with the user interface. The process composer 118 and workspace 120 allow a user to select a Message Event Definition instance as a trigger of an event of a defined process, such that the Event instance is associated with the Message Event Definition instance in the model. Once the process server determines that the ESR event has been fired, the process associated with the Message Event Definition instance is started by an external business process application.

Figure 3:
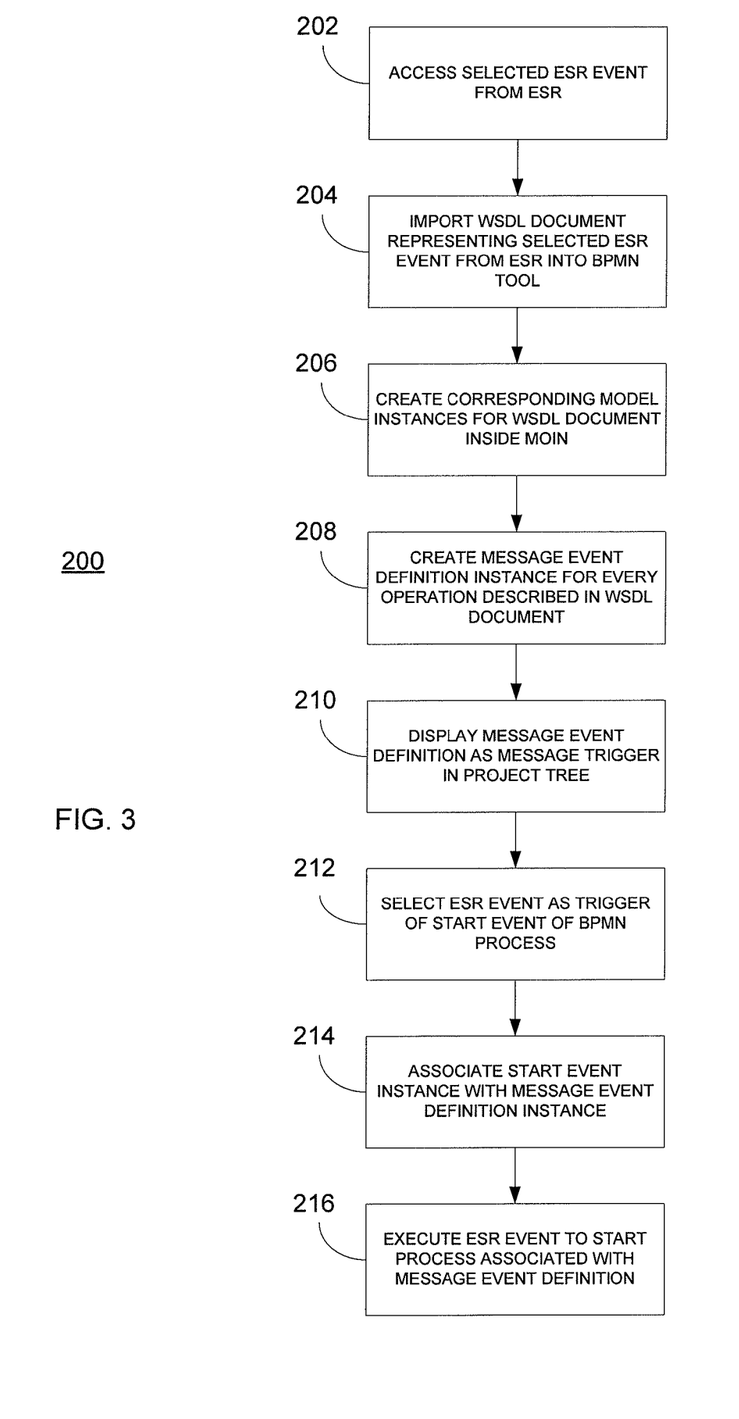
FIG. 3 is a flowchart of a method for integrating ESR events into BPMN processes.

FIG. 3 is a flowchart of a method 200 for integrating ESR events into BPMN processes. The method 200 or any number of its constituent steps can be performed by one or more processors executing a computer program, as defined by computer program code. At 202, based at least in part on a user selection through a workspace of a BPMN tool, an ESR event is accessed from an ESR connected with the BPMN tool. At 204, importation of a WSDL document, which represents the selected ESR event, is initiated by a WSDL importer. At 206, model instances corresponding to the WSDL document are created inside a modeling infrastructure (MOIN), including any of a service interface, operation(s), message(s), data type(s), etc. At 208, a Message Event Definition instance is created for every operation described in the WSDL document, and which can be available to the BPMN tool for defining an event of a process being created and modeled.

At 210, the Message Event Definition can be displayed as a message trigger in a project tree of the BPMN tool. At 212, the ESR event originally selected can now be selected as a trigger for the event of a selected BPMN process. At 214, the event instance is associated with the Message Event Definition instance within the BPMN tool. Then, at 216 the ESR event, as represented by the Message Event Definition instance, can be triggered to start the associated BPMN process.

Accordingly, a generic mechanism and technique is provided for all BPMN tools that allows making use of ESR events or similar objects in a BPMN standards-compliant way. This mechanism and technique brings together ESR domain and BPMN domain, where ESR events can be used inside BPMN tool directly without having to leave the BPMN domain as previously. Accordingly, ESR events can be generated for the user automatically.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method for integrating enterprise services repository (ESR) events into business process model and notation (BPMN) processes, the method being performed by execution of computer readable program code by at least one processor of at least one computer system, the method comprising:

creating, using the at least one processor, an instance of a message event definition based on an ESR event imported into a modeling infrastructure and which can be used as an event of a BPMN process modeled using the modeling infrastructure, wherein the ESR event is stored in an enterprise services repository as a web services description language (WSDL) document containing at least one operation or service to be performed by a business process using the ESR event;

providing, using the at least one processor, the instance of the message event definition as a trigger of the event of the BPMN process for a business process application; and associating, using the at least one processor, the instance of the message event definition with an instance of the event of the BPMN process to link the enterprise service repository event to the BPMN process;

wherein the modeling infrastructure including a WSDL importer for importing at least one user-selected ESR event as a WSDL document into the modeling infrastructure for being tagged as the event of the BPMN process and configured as the message event definition instance by an instance creator mechanism, wherein the WSDL importer creates model instances of the message event definition in the modeling infrastructure for every operation described in the WSDL document and, upon detection of the imported WSDL document as tagged as an event, calls the instance creator mechanism to create the message event definition instance to be represented as the trigger in a project tree of the BPMN process.

2. The method in accordance with claim 1, further comprising:
receiving, using a BPMN tool executed by at least one of the processors, a selection from a user for the ESR event.

3. The method in accordance with claim 2, further comprising:
importing the ESR event selected by the user into the modeling infrastructure from a storage device having the enterprise services repository that stores the ESR event definition.

4. The method in accordance with claim 3, further comprising:
displaying a representation of the message event definition as a message trigger in a project tree associated with the BPMN process.

5. The method in accordance with claim 3, further comprising:
creating model instances for the imported ESR event, the model instances including at least a service interface, one or more messages, and one or more data types associated with operations defined by the ESR event.

6. The method in accordance with claim 1, further comprising:
executing the operation associated with the message event definition to trigger the event of the BPMN process.

7. A system for integrating enterprise services repository (ESR) events into business process modeling notation (BPMN) processes, the system comprising:
a storage device including an enterprise services repository; and
a process composer computer including a BPMN tool in communication with the storage device, the process composer computer including software to implement a method comprising:
creating an instance of a message event definition based on an ESR event imported into a modeling infrastructure and which can be used as an event trigger of a BPMN process modeled using the modeling infrastructure, wherein the ESR event is stored in an enterprise services repository as a web services description language (WSDL) document containing at least one operation or service to be performed by a business process using the ESR event;
providing the instance of the message event definition as a trigger of the event of the BPMN process for a business process application; and
associating the instance of the message event definition with an instance of the event of the BPMN process to link the enterprise repository event to the BPMN process;
wherein the modeling infrastructure including a WSDL importer for importing at least one user-selected ESR event as a WSDL document into the modeling infrastructure for being tagged as the event of the BPMN process and configured as the message event definition instance by an instance creator mechanism, wherein the WSDL importer creates model instances of the message event definition in the modeling infrastructure for every operation described in the WSDL document and, upon detection of the imported WSDL document as tagged as an event, calls the instance creator mechanism to create the message event definition instance to be represented as the trigger in a project tree of the BPMN process.

8. The system in accordance with claim 7, wherein the method further includes:
receiving, using a BPMN tool executed by at least one of the processors, a selection from a user for the ESR event.

9. The system in accordance with claim 8, wherein the method further includes:
importing the ESR event selected by the user into the modeling infrastructure from a storage device having the enterprise services repository that stores the ESR event.

10. The system in accordance with claim 9, wherein the method further includes:
displaying a representation of the message event definition as a message trigger in a project tree.

11. The system in accordance with claim 9, wherein the method further includes:
creating model instances for the imported ESR event, the model instances including at least a service interface, one or more messages, and one or more data types associated with operations defined by the ESR event.

12. The method in accordance with claim 11, wherein the model instances created for the imported ESR event are used to create the message event definition based on the ESR event.

13. The system in accordance with claim 12, wherein the method further includes:
executing the operation associated with the message event definition to trigger the event of the BPMN process.

14. A computer program product for integrating enterprise services repository (ESR) events into business process modeling notation (BPMN) processes, the product comprising a storage medium readable by at least one processor and storing instructions for execution by the at least one processor for:
creating an instance of a message event definition based on an ESR event imported into a modeling infrastructure and which can be used as an event trigger of a BPMN process modeled using the modeling infrastructure, wherein the ESR event is stored in an enterprise services repository as a web services description language (WSDL) document containing at least one operation or service to be performed by a business process using the ESR event;
providing the instance of the message event definition as a trigger of the event of the BPMN process for a business process application; and
associating the instance of the message event definition with an instance of the event of the BPMN process to link the enterprise repository event to the BPMN process;
wherein the modeling infrastructure including a WSDL importer for importing at least one user-selected ESR event as a WSDL document into the modeling infrastructure for being tagged as the event of the BPMN process and configured as the message event definition instance by an instance creator mechanism, wherein the WSDL importer creates model instances of the message event definition in the modeling infrastructure for every operation described in the WSDL document and, upon detection of the imported WSDL document as tagged as an event, calls the instance creator mechanism to create the message event definition instance to be represented as the trigger in a project tree of the BPMN process.

15. The computer program product in accordance with claim 14, wherein the instructions for execution by the at least one processor further include instructions for:
receiving, using a BPMN tool executed by at least one of the processors, a selection from a user for the ESR event.

16. The computer program product in accordance with claim 15, wherein the instructions for execution by the at least one processor further include instructions for:
    importing the ESR event selected by the user into the modeling infrastructure from a storage device having the enterprise services repository that stores the ESR event.

17. The computer program product in accordance with claim 16, wherein the instructions for execution by the at least one processor further include instructions for:
    displaying a representation of the message event definition as a message trigger in a project tree.

18. The computer program product in accordance with claim 14, wherein the instructions for execution by the at least one processor further include instructions for:
    creating model instances for the imported ESR event, the model instances including at least a service interface, one or more messages, and one or more data types associated with operations defined by the ESR event, wherein the model instances created for the imported ESR event are used to create the message event definition based on the ESR event.

19. The computer program product in accordance with claim 14, wherein the instructions for execution by the at least one processor further include instructions for:
    executing the operation associated with the message event definition to trigger the event of the BPMN process.

* * * * *